(12) United States Patent
Kludt et al.

(10) Patent No.: US 8,923,448 B2
(45) Date of Patent: *Dec. 30, 2014

(54) USING ANTENNA POOLING TO ENHANCE A MIMO RECEIVER AUGMENTED BY RF BEAMFORMING

(71) Applicant: Magnolia Broadband Inc., Englewood, NJ (US)

(72) Inventors: Kenneth Kludt, San Jose, CA (US); Eduardo Abreu, Allentown, PA (US); Haim Harel, New York, NY (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/013,190

(22) Filed: Aug. 29, 2013

(65) Prior Publication Data

US 2013/0343493 A1 Dec. 26, 2013

Related U.S. Application Data

(66) Continuation of application No. 13/762,159, filed on Feb. 7, 2013, which is a continuation-in-part of (Continued)

(51) Int. Cl.
*H04B 7/04* (2006.01)
*H04B 7/08* (2006.01)

(52) U.S. Cl.
CPC .............. *H04B 7/0413* (2013.01); *H04B 7/086* (2013.01); *H04B 7/0874* (2013.01)
USPC .......................................... 375/340; 375/316

(58) Field of Classification Search
CPC ........................................................ H04B 7/04
USPC ................................................ 375/340, 316
See application file for complete search history.

(56) References Cited

U.S. PATENT DOCUMENTS

| 4,079,318 A | 3/1978 | Kinoshita |
| 5,732,075 A | 3/1998 | Tangemann et al. |

(Continued)

FOREIGN PATENT DOCUMENTS

| EP | 1 867 177 | 5/2010 |
| EP | 2 234 355 | 9/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Michael Neff
(74) *Attorney, Agent, or Firm* — Pearl Cohen Zedek Latzer Baratz LLP (57) ABSTRACT

A system having a multi-layer (multi-stream) multiple-input-multiple-output (MIMO) receiving system, having a MIMO baseband module and a radio distribution network (RDN) connected to the MIMO receiving system. The RDN has two or more beamformers that are fed by two or more antennas, so that a total number of antennas in the system are greater than the number of branches of the MIMO baseband module. Each of the beamformers combines RF signals coming from the antennas. The system further implements an antenna routing module that swaps antennas between different beamformers according to one or more qualitative indicators derived from the baseband module, thus increasing the probability of grouping antennas that have lower conflicts between best phases of different layers' transmitted signals. The system increases the range of antenna selection beyond the set of antennas available for each beamformer.

10 Claims, 7 Drawing Sheets

Related U.S. Application Data application No. 13/630,146, filed on Sep. 28, 2012, Substitute for application No. 61/655,592, filed on Jun. 28, 2012.

(60) Provisional application No. 61/652,743, filed on May 29, 2012, provisional application No. 61/658,015, filed on Jun. 11, 2012, provisional application No. 61/657,999, filed on Jun. 11, 2012, provisional application No. 61/658,015, filed on Jun. 11, 2012, provisional application No. 61/665,600, filed on Jun. 28, 2012, provisional application No. 61/671,417, filed on Jul. 13, 2012.

(56) References Cited

U.S. PATENT DOCUMENTS

| | | |
|---|---|---|
| 5,915,215 A | 6/1999 | Williams et al. |
| 5,936,577 A | 8/1999 | Shoki et al. |
| 6,046,655 A | 4/2000 | Cipolla |
| 6,101,399 A | 8/2000 | Raleigh et al. |
| 6,163,695 A | 12/2000 | Takemura |
| 6,167,286 A | 12/2000 | Ward et al. |
| 6,215,812 B1 | 4/2001 | Young et al. |
| 6,226,507 B1 | 5/2001 | Ramesh et al. |
| 6,259,683 B1 | 7/2001 | Sekine et al. |
| 6,321,077 B1 | 11/2001 | Saitoh et al. |
| 6,335,953 B1 | 1/2002 | Sanderford et al. |
| 6,370,378 B1 | 4/2002 | Yahagi |
| 6,377,783 B1 | 4/2002 | Lo et al. |
| 6,393,282 B1 | 5/2002 | Iimori |
| 6,697,622 B1 | 2/2004 | Ishikawa et al. |
| 6,834,073 B1 | 12/2004 | Miller et al. |
| 6,842,460 B1 | 1/2005 | Olkkonen et al. |
| 6,927,646 B2 | 8/2005 | Niemi |
| 6,975,582 B1 | 12/2005 | Karabinis et al. |
| 6,987,958 B1 | 1/2006 | Lo et al. |
| 7,190,964 B2 | 3/2007 | Damnjanovic et al. |
| 7,257,425 B2 | 8/2007 | Wang et al. |
| 7,299,072 B2 | 11/2007 | Ninomiya |
| 7,392,015 B1 | 6/2008 | Farlow et al. |
| 7,474,676 B2 | 1/2009 | Tao et al. |
| 7,499,109 B2 | 3/2009 | Kim et al. |
| 7,719,993 B2 | 5/2010 | Li et al. |
| 7,742,000 B2 | 6/2010 | Mohamadi |
| 7,769,107 B2 | 8/2010 | Sandhu et al. |
| 7,898,478 B2 | 3/2011 | Niu et al. |
| 7,970,366 B2 | 6/2011 | Arita et al. |
| 8,155,613 B2 | 4/2012 | Kent et al. |
| 8,280,443 B2 | 10/2012 | Tao et al. |
| 8,294,625 B2 | 10/2012 | Kittinger et al. |
| 8,306,012 B2 | 11/2012 | Lindoff et al. |
| 8,369,436 B2 | 2/2013 | Stirling-Gallacher |
| 8,509,190 B2 | 8/2013 | Rofougaran |
| 8,520,657 B2 | 8/2013 | Rofougaran |
| 8,588,844 B2 | 11/2013 | Shpak |
| 8,599,955 B1 | 12/2013 | Kludt et al. |
| 8,644,413 B2 | 2/2014 | Harel et al. |
| 8,649,458 B2 * | 2/2014 | Kludt et al. .................. 375/267 |
| 8,666,319 B2 | 3/2014 | Kloper et al. |
| 8,744,511 B2 | 6/2014 | Jones et al. |
| 2002/0024975 A1 | 2/2002 | Hendler |
| 2002/0107013 A1 | 8/2002 | Fitzgerald |
| 2002/0115474 A1 | 8/2002 | Yoshino et al. |
| 2002/0181426 A1 | 12/2002 | Sherman |
| 2002/0181437 A1 | 12/2002 | Ohkubo et al. |
| 2003/0087645 A1 | 5/2003 | Kim et al. |
| 2003/0153360 A1 | 8/2003 | Burke et al. |
| 2003/0186653 A1 | 10/2003 | Mohebbi et al. |
| 2004/0023693 A1 | 2/2004 | Okawa et al. |
| 2004/0063455 A1 | 4/2004 | Eran et al. |
| 2004/0081144 A1 | 4/2004 | Martin et al. |
| 2004/0125900 A1 | 7/2004 | Liu et al. |
| 2004/0142696 A1 | 7/2004 | Saunders et al. |
| 2004/0147266 A1 | 7/2004 | Hwang et al. |
| 2004/0156399 A1 | 8/2004 | Eran |
| 2004/0198292 A1 | 10/2004 | Smith et al. |
| 2004/0264504 A1 | 12/2004 | Jin |
| 2005/0068230 A1 | 3/2005 | Munoz et al. |
| 2005/0075140 A1 | 4/2005 | Famolari |
| 2005/0129155 A1 | 6/2005 | Hoshino |
| 2005/0147023 A1 | 7/2005 | Stephens et al. |
| 2005/0163097 A1 | 7/2005 | Do et al. |
| 2005/0245224 A1 | 11/2005 | Kurioka |
| 2005/0250544 A1 | 11/2005 | Grant et al. |
| 2005/0254513 A1 | 11/2005 | Cave et al. |
| 2005/0287962 A1 | 12/2005 | Mehta et al. |
| 2006/0041676 A1 | 2/2006 | Sherman |
| 2006/0092889 A1 | 5/2006 | Lyons et al. |
| 2006/0094372 A1 | 5/2006 | Ahn et al. |
| 2006/0111149 A1 | 5/2006 | Chitrapu et al. |
| 2006/0135097 A1 | 6/2006 | Wang et al. |
| 2006/0183503 A1 | 8/2006 | Goldberg |
| 2006/0203850 A1 | 9/2006 | Johnson et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0076675 A1 | 4/2007 | Chen |
| 2007/0097918 A1 | 5/2007 | Cai et al. |
| 2007/0115914 A1 | 5/2007 | Ohkubo et al. |
| 2007/0152903 A1 | 7/2007 | Lin et al. |
| 2007/0217352 A1 | 9/2007 | Kwon |
| 2007/0223380 A1 | 9/2007 | Gilbert et al. |
| 2008/0051037 A1 | 2/2008 | Molnar et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2010/0002656 A1 | 1/2010 | Ji et al. |
| 2010/0040369 A1 | 2/2010 | Zhao et al. |
| 2010/0067473 A1 | 3/2010 | Cave et al. |
| 2010/0111039 A1 | 5/2010 | Kim et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0234071 A1 | 9/2010 | Shabtay et al. |
| 2010/0278063 A1 | 11/2010 | Kim et al. |
| 2010/0285752 A1 | 11/2010 | Lakshmanan et al. |
| 2010/0291931 A1 | 11/2010 | Suemitsu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085532 A1 | 4/2011 | Scherzer et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0151826 A1 | 6/2011 | Miller et al. |
| 2011/0205883 A1 | 8/2011 | Mihota |
| 2011/0205998 A1 | 8/2011 | Hart et al. |
| 2011/0228742 A1 | 9/2011 | Honkasalo et al. |

(56) References Cited

U.S. PATENT DOCUMENTS

| | | |
|---|---|---|
| 2011/0249576 A1 | 10/2011 | Chrisikos et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2012/0014377 A1 | 1/2012 | Joergensen et al. |
| 2012/0020396 A1 | 1/2012 | Hohne et al. |
| 2012/0027000 A1 | 2/2012 | Wentink |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0064838 A1 | 3/2012 | Miao et al. |
| 2012/0069828 A1 | 3/2012 | Taki et al. |
| 2012/0076229 A1 | 3/2012 | Brobston et al. |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0201153 A1 | 8/2012 | Bharadia et al. |
| 2012/0201173 A1 | 8/2012 | Jain et al. |
| 2012/0212372 A1 | 8/2012 | Petersson et al. |
| 2012/0213065 A1 | 8/2012 | Koo et al. |
| 2012/0220331 A1 | 8/2012 | Luo et al. |
| 2012/0230380 A1 | 9/2012 | Keusgen et al. |
| 2012/0270531 A1 | 10/2012 | Wright et al. |
| 2012/0281598 A1 | 11/2012 | Struhsaker et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0017794 A1 | 1/2013 | Kloper et al. |
| 2013/0044877 A1 | 2/2013 | Liu et al. |
| 2013/0058239 A1 | 3/2013 | Wang et al. |
| 2013/0079048 A1 | 3/2013 | Cai et al. |
| 2013/0094437 A1 | 4/2013 | Bhattacharya |
| 2013/0095780 A1 | 4/2013 | Prazan et al. |
| 2013/0156016 A1 | 6/2013 | Debnath et al. |
| 2013/0156120 A1 | 6/2013 | Josiam et al. |
| 2013/0170388 A1 | 7/2013 | Ito et al. |
| 2013/0190006 A1 | 7/2013 | Kazmi et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0229999 A1 | 9/2013 | Da Silva et al. |
| 2013/0235720 A1 | 9/2013 | Wang et al. |
| 2013/0242899 A1 | 9/2013 | Lysejko et al. |
| 2013/0242965 A1 | 9/2013 | Horn et al. |
| 2013/0242976 A1 | 9/2013 | Katayama et al. |
| 2013/0272437 A1 | 10/2013 | Eidson et al. |
| 2013/0301551 A1 | 11/2013 | Ghosh et al. |
| 2013/0343369 A1 | 12/2013 | Yamaura |
| 2014/0010089 A1 | 1/2014 | Cai et al. |
| 2014/0010211 A1 | 1/2014 | Asterjadhi et al. |
| 2014/0029433 A1 | 1/2014 | Wentink |
| 2014/0071873 A1 | 3/2014 | Wang et al. |
| 2014/0086077 A1 | 3/2014 | Safavi |
| 2014/0086081 A1 | 3/2014 | Mack et al. |
| 2014/0098681 A1 | 4/2014 | Stager et al. |
| 2014/0119288 A1 | 5/2014 | Zhu et al. |
| 2014/0185501 A1 | 7/2014 | Park et al. |
| 2014/0185535 A1 | 7/2014 | Park et al. |
| 2014/0192820 A1 | 7/2014 | Azizi et al. |
| 2014/0204821 A1 | 7/2014 | Seok et al. |

FOREIGN PATENT DOCUMENTS

| | | |
|---|---|---|
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.

(56) References Cited

OTHER PUBLICATIONS

Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued for U.S. Appl. No. 14/013,190 dated Jul. 25, 2014.
Office Action issued for U.S. Appl. No. 14/198,280 dated Jul. 29, 2014.
Office Action issued for U.S. Appl. No. 14/042,020 dated Jul. 31, 2014.
Notice of Allowance issued for U.S. Appl. No. 14/010,771 dated Aug. 6, 2014.
Office Action issued for U.S. Appl. No. 14/306,458 dated Aug. 13, 2014.
Office Action issued for U.S. Appl. No. 14/297,898 dated Aug. 15, 2014.
Notice of Allowance issued for U.S. Appl. No. 14/085,252 dated Aug. 27, 2014.
Office Action issued for U.S. Appl. No. 14/181,844 dated Aug. 29, 2014.
Office Action issued for U.S. Appl. No. 14/296,209 dated Sep. 4, 2014.
Notice of Allowance issued for U.S. Appl. No. 14/097,765 dated Sep. 8, 2014.
Notice of Allowance issued for U.S. Appl. No. 14/143,580 dated Sep. 8, 2014.
Office Action issued for U.S. Appl. No. 14/198,155 dated Sep. 12, 2014.
Office Action issued for U.S. Appl. No. 14/173,640 dated Oct. 6, 2014.
Office Action issued for U.S. Appl. No. 14/449,431 dated Oct. 10, 2014.
Office Action issued for U.S. Appl. No. 14/171,736 dated Oct. 16, 2014.
Notice of Allowance issued for U.S. Appl. No. 14/011,521 dated Oct. 20, 2014.

* cited by examiner

USING ANTENNA POOLING TO ENHANCE A MIMO RECEIVER AUGMENTED BY RF BEAMFORMING

CROSS-REFERENCE TO RELATED APPLICATIONS

This application is a continuation application of U.S. patent application Ser. No. 13/762,159 filed on Feb. 7, 2013, which claims benefit of U.S. provisional patent application Nos. 61/658,015 filed on Jun. 11, 2012; 61/665,600 filed on Jun. 28, 2012; and 61/671,417 filed on Jul. 13, 2012; and U.S. patent application Ser. No. 13/762,159 is a continuation-in-part application of U.S. patent application Ser. No. 13/630,146 filed on Sep. 28, 2012, which claims benefit from U.S. provisional patent application Nos. 61/652,743 filed on May 29, 2012; 61/658,015 filed on Jun. 11, 2012; 61/657,999 filed on Jun. 11, 2012; and 61/665,592 filed on Jun. 28, 2012, all of which are incorporated herein by reference in their entirety.

FIELD OF THE INVENTION

The present invention relates generally to the field of radio frequency (RF) multiple-input-multiple-output (MIMO) systems and in particular to systems and methods for enhanced performance of RF MIMO systems using RF beamforming and/or digital signal processing.

BACKGROUND OF THE INVENTION

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and usually includes a combiner and may further include switches, controllable phase shifters, and in some cases amplifiers and/or attenuators.

The term "Receiving Radio Distribution Network" or "Rx RDN" or simply "RDN" as used herein is defined as a group of beamformers as set forth above.

The term "hybrid MIMO RDN" as used herein is defined as a MIMO system that employs two or more antennas per channel (N is the number of channels and M is the total number of antennas and M>N). This architecture employs a beamformer for each channel so that two or more antennas are combined for each radio circuit that is connected to each of the channels.

In hybrid MIMO RDN receiving systems, when the phases of the received signals from each antenna are properly adjusted or tuned with respect to one another, the individual signals may be combined and result in an improved SNR for the receiving system.

BRIEF SUMMARY OF EMBODIMENTS OF THE INVENTION

While standard MIMO receivers are capable of accumulating energy from all available antennas for each layer, without interdependency, additional antennas that are RF combined may need to rely on one weights setting that fits all layers, which may adversely affect performance; the source of the issue comes from the random or loosely correlated nature of the various layers' signals, as viewed by the various participant antennas in the RF beamforming; specifically, phases setting that optimizes a group of RF combined antennas' output for a given layer, may be suboptimal or even detrimental to others; it is therefore imperative to set a weight in such a way that will consider all layers.

Embodiments of the present invention provides a method that increases the set of antennas to be chosen, beyond the number of available inputs in the given RF combiners; it thus takes advantage of the very same randomness that characterizes the various layers' signals seen by each receiving antenna, picking best combinations and providing reduction of the performance loss; to achieve that, the invention offers a categorization where each candidate antenna to be combined with others is declared "good" if it can see all layers in non-conflicting phases, and "bad" if it cannot.

Finally, embodiments of the invention take advantage of possible existence of several RF beamformers in the MIMO receiving system, each required to solve the same issue, by swapping antennas amongst the various beamformers, and thus using all or most available antenna resources.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

The drawings together with the following detailed description make the embodiments of the invention apparent to those skilled in the art.

DETAILED DESCRIPTION OF EMBODIMENTS OF THE INVENTION

It is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Figure 1:
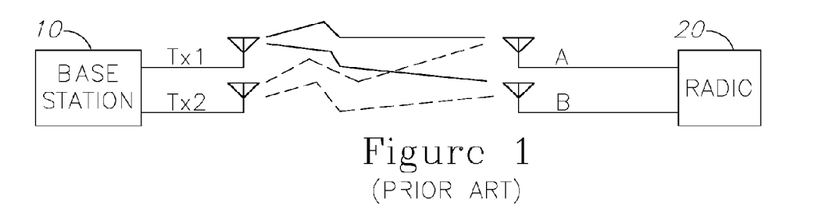
FIG. 1 is an example of a legacy 2×2 MIMO system according to the prior art.

FIG. 1 shows an example of a standard 2×2 MIMO receiver with two antennas communicating with a base station. While each antenna receives both transmitted layers, the baseband separates them in the decoding process, while combining the energy received by each antenna.

Figure 2:
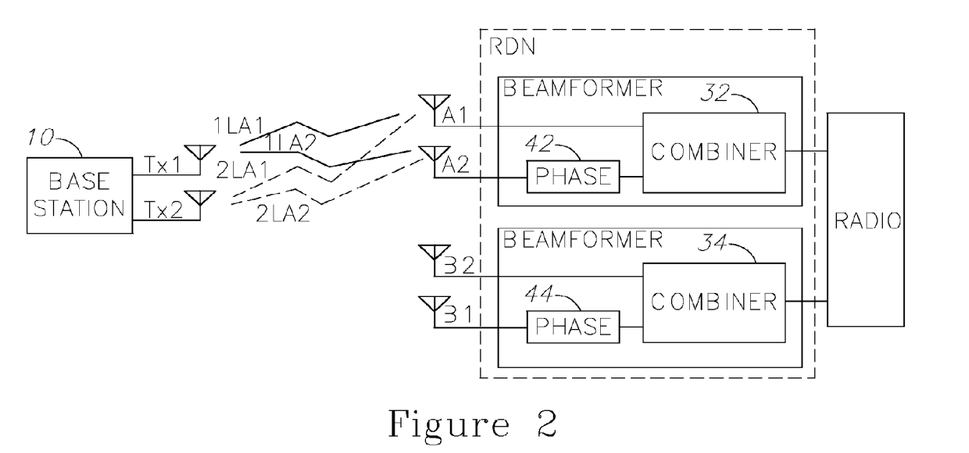
FIG. 2 is an example of the 2×2 MIMO system augmented by a Radio Distribution Network (RDN) according to the present invention.

FIG. 2 shows an example of the MIMO receiver augmented by two additional antennas: if the phase shift introduced between the two antennas by phase shifters 42 and 44 optimizes the 1st layer, that phase shifter setting will only be correct for the $2^{nd}$ layer if multipath experienced by the two layers are similar. That is unlikely as multi-layer MIMO design is based on low correlation of the various streams; consequently, the relations between those phases that optimize both layers tend to be random.

Consider a simplified example case, where the said two layers are each transmitted from one Tx antenna (so that Tx1 radiates one stream and Tx2 the other): If we compare the case using four 90 degree phase shifts to align the signals from Tx1, we see there are three possible outcomes for the Tx2 signal:
1. The signals arrive at the antennas A1 and A2 with a similar phase differences as for the Tx1 transmission so the same phase setting used to enhance the reception of Tx1 will also enhance Tx2. (25%)
2. The resulting Tx2 signals to A1 and A2 are +/−90 degrees from each other and will produce zero diversity gain for this process. (50%)
3. The resulting Tx2 signals are 180 degrees from each other and can cancel each other and produce a negative diversity gain depending on their relative amplitudes. (25%)

When the result is the outcome 3, the system could choose to sacrifice diversity gain for Tx1 in order to avoid the total loss of the Tx2 signal. This may result in low diversity gain (~0 dB) for both Tx1 and Tx2.

The issue at hand is the need to use a single degree of freedom i.e. the need to choose one phase in aligning a beamformer that serves 2, 4, or more different phase setting, stemming from the fact that multiple incoming signals have each a specific possible phase alignment for the beamformer. This invention presents an alternate approach to sacrificing gain as described above. The need to sacrifice diversity gain may be averted by providing a choice of additional antenna combinations.

The present invention, in embodiments thereof, discloses a system comprising: (i) a multiple-input-multiple-output (MIMO) receiving system comprising a MIMO baseband module having N branches; (ii) a radio distribution network (RDN) connected to the MIMO receiving system, the RDN comprising at least two beamformers, wherein each of the beamformers is fed by two or more antennas, so that a total number of antennas in the system is M, wherein M is greater than N, wherein each of the beamformers includes at least one combiner configured to combine signals coming from the antennas feeding the respective beamformer into a combined signal; and (iii) an antenna routing module configured to swap at least one pair of antennas, each of the antennas in the at least one pair being associated with a different beamformer, wherein the antenna routing module is configured to swap said at least one pair of antennas.

These additional, and/or other aspects and/or advantages of the present invention are set forth in the detailed description which follows.

When using a phase optimization process like the antennas selection application, the enhancement achieved, is based on suboptimal setting for TX1 in order to eliminate destructive combining in other Tx signals.

This invention is yet another enhancement which increases the range of antenna selection beyond the set of antennas available for each beamformer, thus increasing the probability of grouping antennas that have lower conflicts between best phases of different Tx signals. The present invention can be used with or without phase selection process.

The system, as illustrated in FIGS. 3, 5 and 8-11 that are explained in detail below, comprises a multiple-input-multiple-output (MIMO) receiving system comprising a MIMO baseband module having N branches and a radio distribution network (RDN) connected to the MIMO receiving system.

The RDN comprising at least two beamformers, each fed by two or more antennas, so that a total number of antennas in the system is M, wherein M is greater than N.

Each beamformer includes at least one combiner configured to combine signals coming from the antennas feeding the respective beamformer into a combined signal.

The system further comprises an antenna routing module configured to swap at least one pair of antennas, each of the antennas in the at least one pair being associated with a different beamformer. The antenna routing module is configured to swap said at least one pair of antennas In some embodiments, the antenna routing module may be configured to route a subset of the antennas with respect to corresponding beamformers according to a switching matrix that is dynamically adjusted according to the qualitative indicators. Examples for matrices are presented in FIG. 3 (matrix 70), FIG. 8 (matrix 832) and FIG. 11 (matrix 1132 & 1134), as well as in FIGS. 5, 9 and 10, as implemented the switches (see below).

The swapped pair of antennas may be selected to increase a diversity gain of the MIMO receiving system.

The swapped pair of antennas may be selected with respect to at least one of signal phases and signal amplitudes.

The swapped pair of antennas may be selected according to a specified antenna signal weighting.

The qualitative indicators comprise a combined power of all beamformers, $PWR_{TOTAL}$, defined as (see explanation below):

$$PWR_{TOTAL} = \sum_{r=1}^{NBF} BF_{PWR_r},$$

where NBF is the total number of beamformers in RDN and $BF_{PWR_r}$ is output power of the beamformer "r".
and at least one swapped pair of antennas may be selected to maximize $PWR_{TOTAL}$.

The present invention further comprises a method of improving reception by a multiple-input-multiple-output (MIMO) receiving system comprising a MIMO baseband module having N branches and a radio distribution network (RDN) connected to the MIMO receiving system.

The method comprises associating at least two beamformers with the RDN, each of the beamformers including at least one corresponding combiner; feeding each of the beamformers by two or more antennas, so that a total number of antennas in the system is M, wherein M is greater than N; configuring each combiner to combine signals coming from the antennas feeding the corresponding beamformer into a combined signal; and swapping at least one pair of antennas, each of the antennas in the at least one pair being associated with a different beamformer, based on qualitative indicators derived from the baseband module.

In embodiments, the method further comprises routing a subset of the antennas with respect to corresponding beamformers by a switching matrix that is dynamically adjusted according to the qualitative indicators. In embodiments, the method further comprises selecting the at least one swapped pair of antennas according to the above specified criteria.

Figure 3:
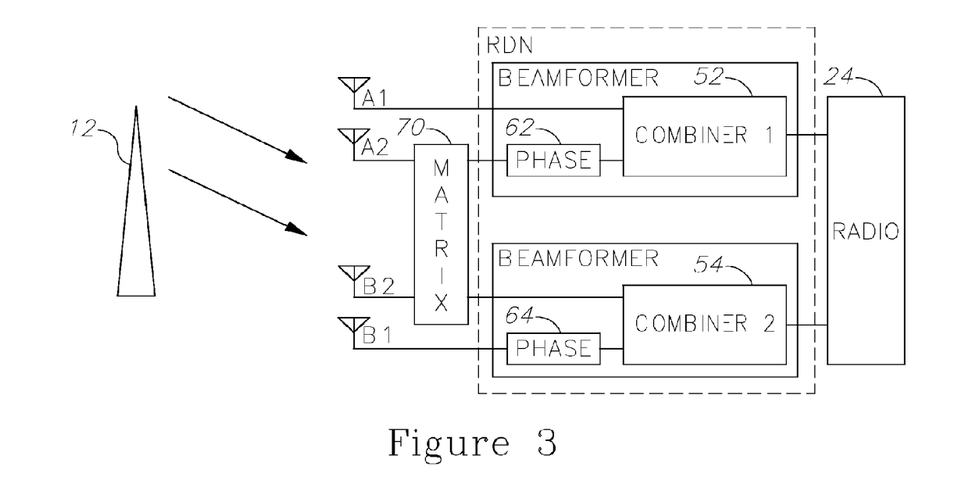
FIG. 3 is a schematic high level illustration of a simple MIMO receiving system with the RDN and antenna routing module, according to some embodiments of the invention.

FIG. 3 is a schematic high level illustration of a simple MIMO receiving system with the RDN and antenna routing module, according to some embodiments of the invention. One beamformer in the RDN comprises phase modulator 62 and combiner 52, another beamformer comprises phase modulator 64 and combiner 54. Antenna routing module comprises switching according to matrix 70, as explained below. It shows that the antennas A2, B2 are placed in an "Antenna Pool" and selected under processor control through a matrix switch 70 to be combined. In this example, antenna A1 may be paired with either A2 or B2 to improve chances of non-conflicting phase setting for both layers.

Figure 4:
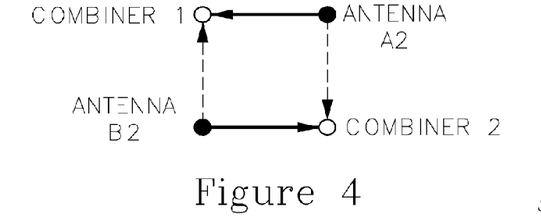
FIG. 4 is an implementation for antenna routing module using switch matrix for the case illustrated in FIG. 3, according to some embodiments of the invention.

FIG. 4 is an implementation for switch matrix 70 for the case illustrated in FIG. 3, according to some embodiments of the invention. In this simple case switch matrix 70 is implemented as a transfer switch.

Figure 5:
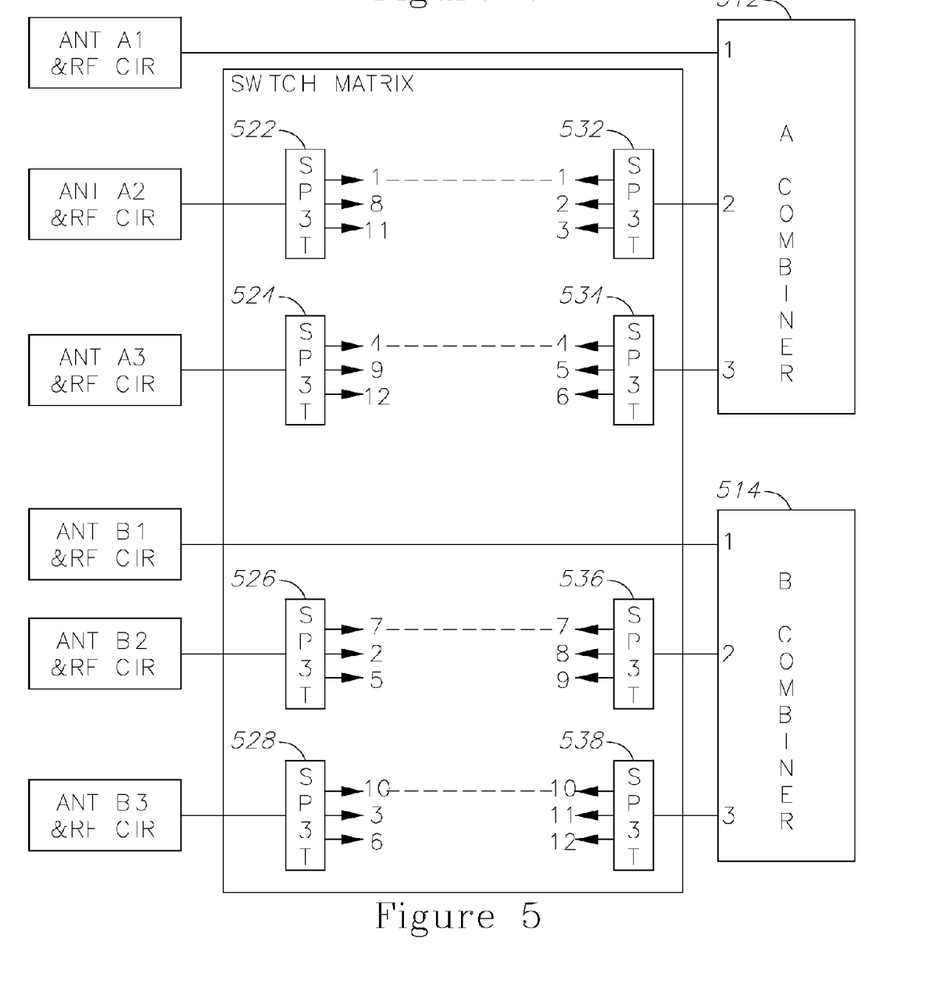
FIG. 5 is a schematic high level illustration of a more complex MIMO receiving system with the RDN and antenna routing module, according to some embodiments of the invention.

FIG. 5 is a schematic illustration of a more complex MIMO receiving system with the RDN and antenna routing module, according to some embodiments of the invention. One beamformer in the RDN is associated with antennas A1, A2 and A3 and comprises combiner 512, another beamformer is associated with antennas B1, B2 and B3 and comprises combiner 514. The antenna routing module is implemented in switches 522, 532, 524, 534 and switches 526, 536, 528, 538 corresponding to the beamformers, as explained below.

When the signals from the three antennas are perfectly aligned in phase, this configuration offers up to 4.77 dB gain over the single antenna. If the signals are aligned in phase for Tx1, there are 16 possible outcomes for receiving Tx2 when each of the two diversity antennas has four possible phases 0, 90, 180 270 degrees.

Figure 6:
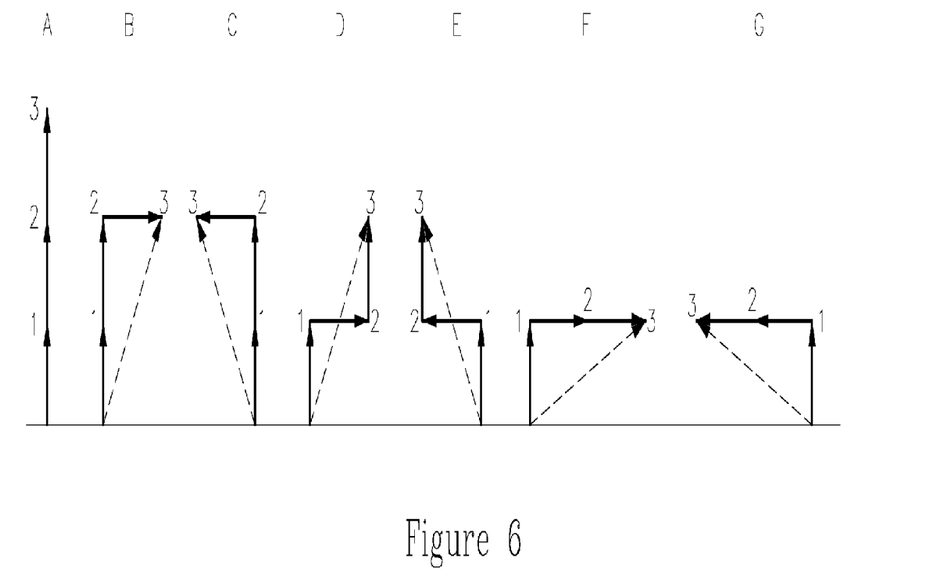
FIGS. 6 & 7 are signal phase diagrams illustrating the phase relationship of signals received by antennas according to embodiment of the present invention.
Figure 7:
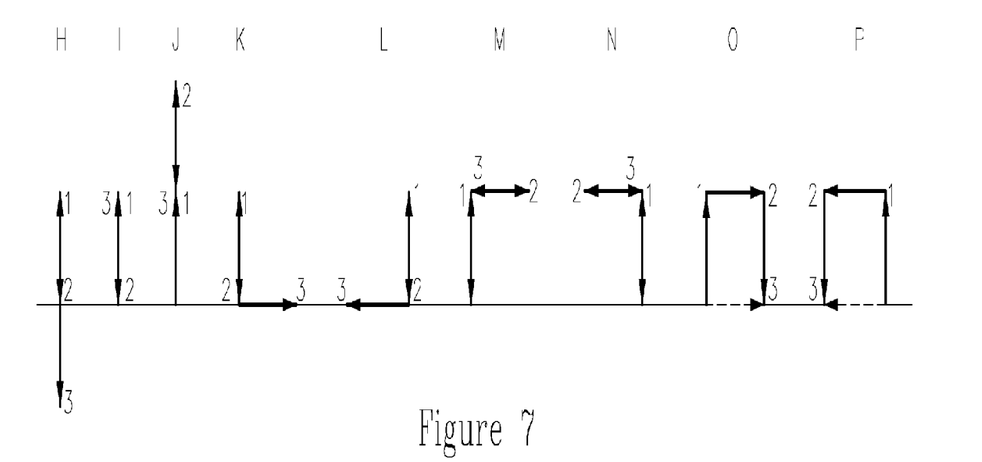

FIG. 6 and FIG. 7 are signal phase diagrams illustrating the dependency of the signals received from each antenna as they are combined in combiners 512 or 514 as described by FIG. 5. FIG. 6 shows the cases where alignment of Tx1 signals result in positive gains for Tx2 reception, while FIG. 7 shows the cases where Tx2 signals result in negative gains. For every one of these relationships, the signal from one antenna is cancelled by one of the others, leaving a −4.77 dB result.

There are nine phase relationships designated H-P in FIG. 7 that produce negative diversity gain and seven phase relationships shown in FIG. 6 that produce positive gain. This means there is a 7/16 or 43.75% probability that the random combination of signals will produce positive diversity gain for one beamformer and about 43.75% squared (19%) chance both beamformers will produce a positive gain. 81% of the time at least one beamformer will experience negative gain. One strategy to increase the possibility to show positive gain in both beamformers is to substitute a different antenna for one of the antennas in the beamformer that produces the negative gain. If an antenna from each beamformer is swapped with the other the probability the new combination of antennas experiences negative gain is also 81%. This means for the two configurations the probability of negative gain is approximately 81% squared or 65%. This means the probability that the two beamformers both create positive gain is increased from 19% to 35% by trying a second antenna combination. Clearly, testing more antenna combinations improves the chance that we can find one combination that produces positive gain in both beamformers.

FIG. 5 illustrates a means to assign each of the four diversity antennas (A2, A3, B2 and B3) to either beamformer (A or B). We can evaluate the improvement in diversity gain for this capability by considering the pairing possibilities for antenna A1. It can be used with any two from the set of the four antennas A2, A3, B2 and B3 in combiner 512. Because the antenna pairing for Antenna B1 is determined by the antennas not used for antenna A1, the number of choices is given by the combination probability equation for "n, choose k" in formula (1) as follows $$\binom{n}{k} = \frac{n!}{k!(n-k)!} \quad (1)$$

For this case n=4 and k=2 and the equation shows there are six unique combinations for antenna selection. We can show that by choosing from the best of the six antenna combinations reduces the probability no combination produces positive gain in both beamformers from 81% to approximately 28%. This means 72% of the time we should find a combination that produces positive gain.

In the previous embodiment all of the diversity antennas were pooled to produce the maximum number of combinations to choose from. It is possible to use the circuit of FIG. 5 to allow six antenna combinations within a larger antenna array.

FIG. 7 is a schematic illustration of possible switching configurations in FIG. 5 that result in no diversity gain, according to some embodiments of the invention.

Figure 8:
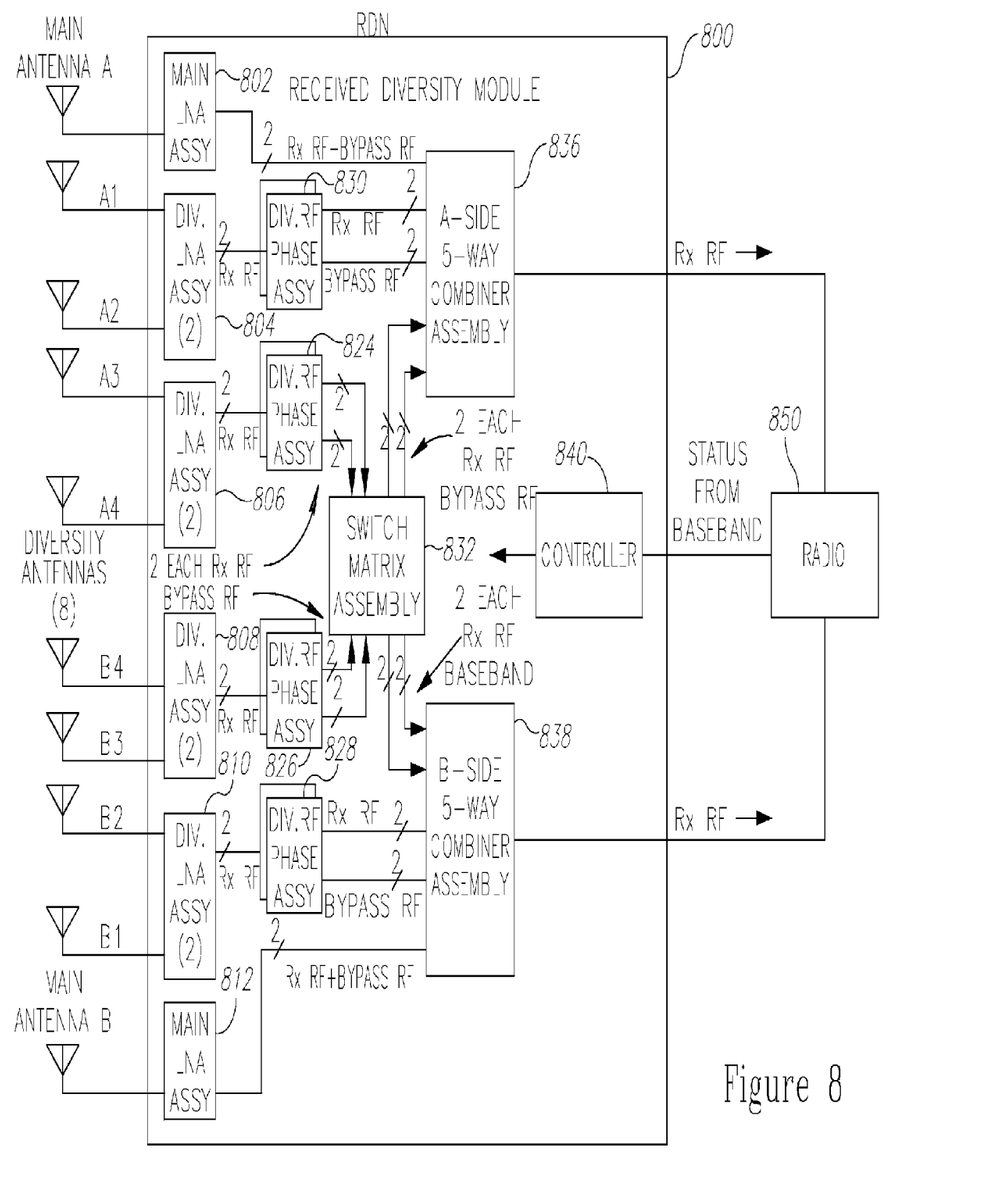
FIG. 8 is a schematic high level illustration of a MIMO receiving system having a ten antenna array with the RDN and antenna routing module pooling 4 antennas, according to some embodiments of the invention.

FIG. 8 is a schematic illustration of a MIMO receiving system having a ten antenna array with the RDN and antenna routing module embodied as device 800, according to some embodiments of the invention. One beamformer in the RDN is associated with a main antenna A and four of the diversity antennas A1 . . . A4 and comprises LNA assemblies 802, 804, 806, phase modulators 830, 824 and combiner 836, another beamformer is associated with a main antenna B and another four of the diversity antennas B1 . . . B4 and comprises LNA assemblies 808, 810, 812, phase modulators 826, 828 and combiner 838. The diversity antennas B1 . . . B4 are modulated by the corresponding LNA assemblies and phase modulators. The antenna routing module is implemented by a switch matrix assembly 832. Combiners 836 and 838 are connected to radio unit 850, which is also connected to controller 840 that controls the setting of the switch matrix 832 according to qualitative indicators that are derived from the baseband module.

Figure 9:
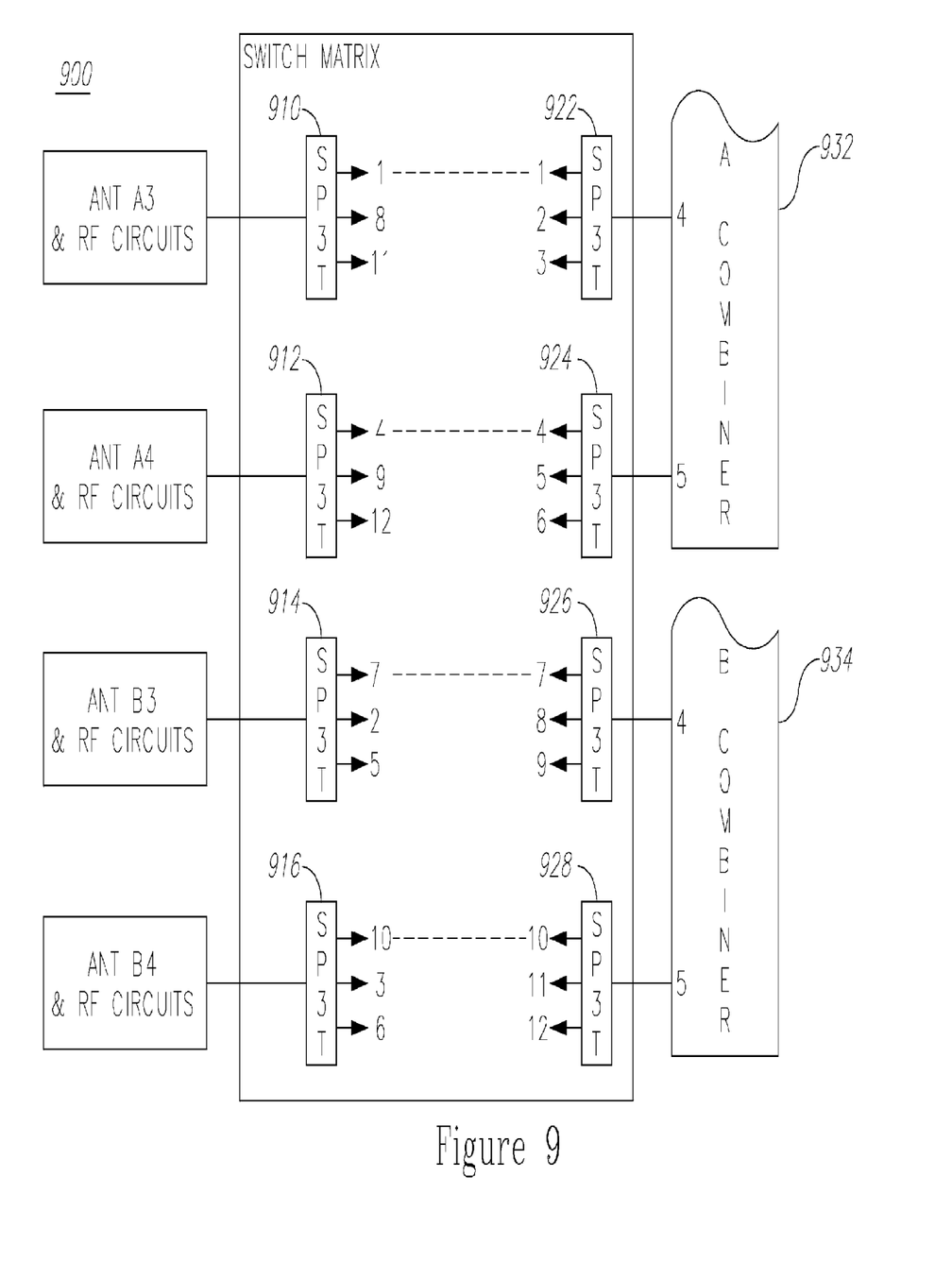
FIG. 9 is a schematic high level illustration of the switch matrix, as implemented for the system of FIG. 8, according to some embodiments of the invention.

FIG. 9 is a schematic illustration antenna routing module implementation using a switch matrix, used in the system of FIG. 8, according to some embodiments of the invention. One beamformer in the RDN is associated with antennas A, A1 . . . A4 and comprises combiner 932, another beamformer is associated with antennas B, B1 . . . B4 and comprises combiner 934. The antenna routing module implementation in the form of a switch matrix is comprised of switches 910, 922, 912, 924 and switches 914, 926, 916, 928 corresponding to the beamformers, as explained below.

For this configuration, antennas A3 and A4 are pooled with antennas B3 and B4 using the circuit of FIG. 9 to provide for the six possible configurations as in the previous discussion.

Figure 10:
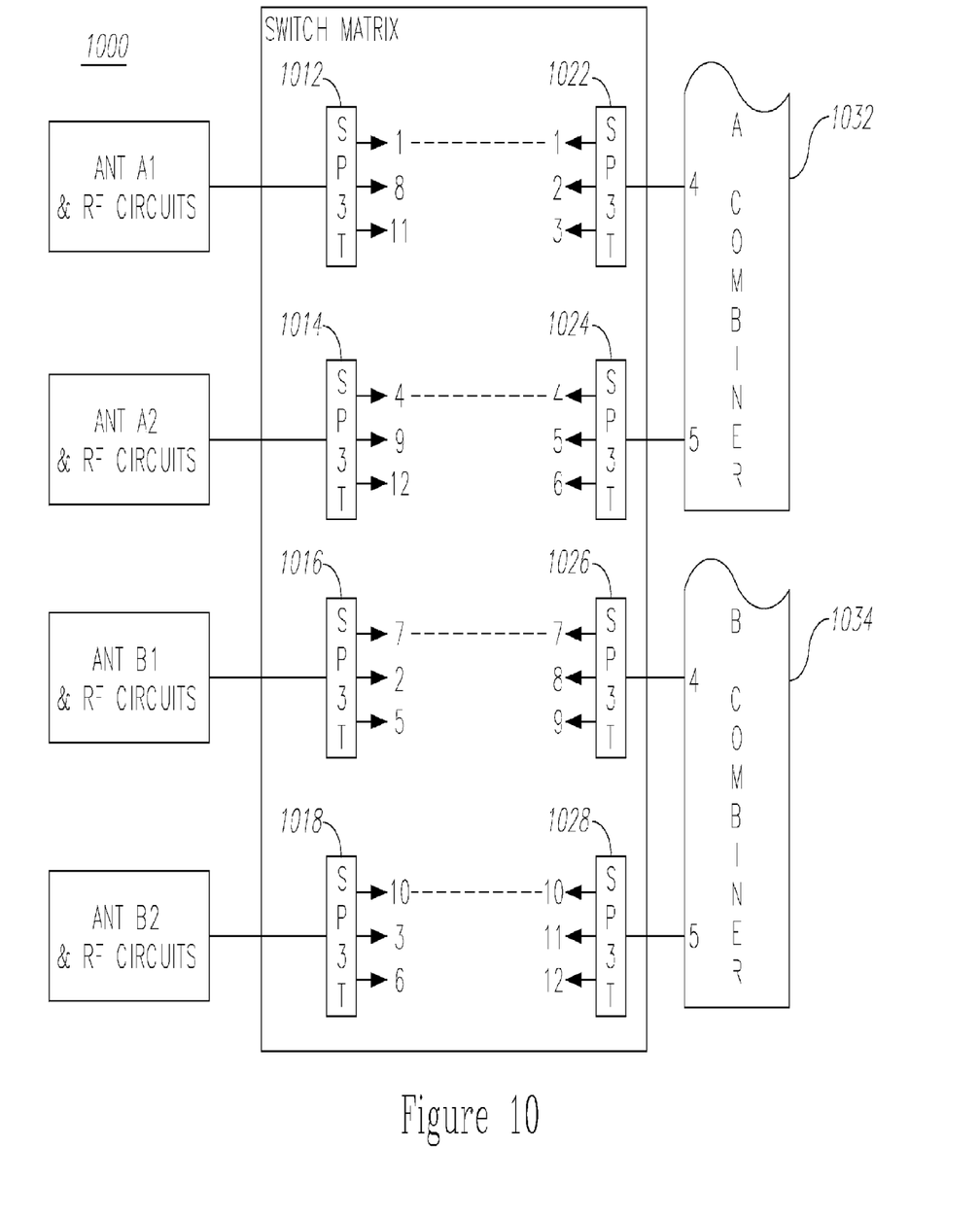
FIG. 10 is a schematic high level illustration of the switch matrix, as implemented for the system of FIG. 11, according to some embodiments of the invention.

As shown in FIG. 8, the circuit of FIG. 9 must be duplicated to route the "bypass" signals from the antennas. Additional switch matrices may be added to pool other antennas. A following paragraph described later on in FIG. 10 shows how a second switch matrix could be used with antennas A1, A2, B1 and B2. The application in the system is shown in FIG. 11.

Figure 11:
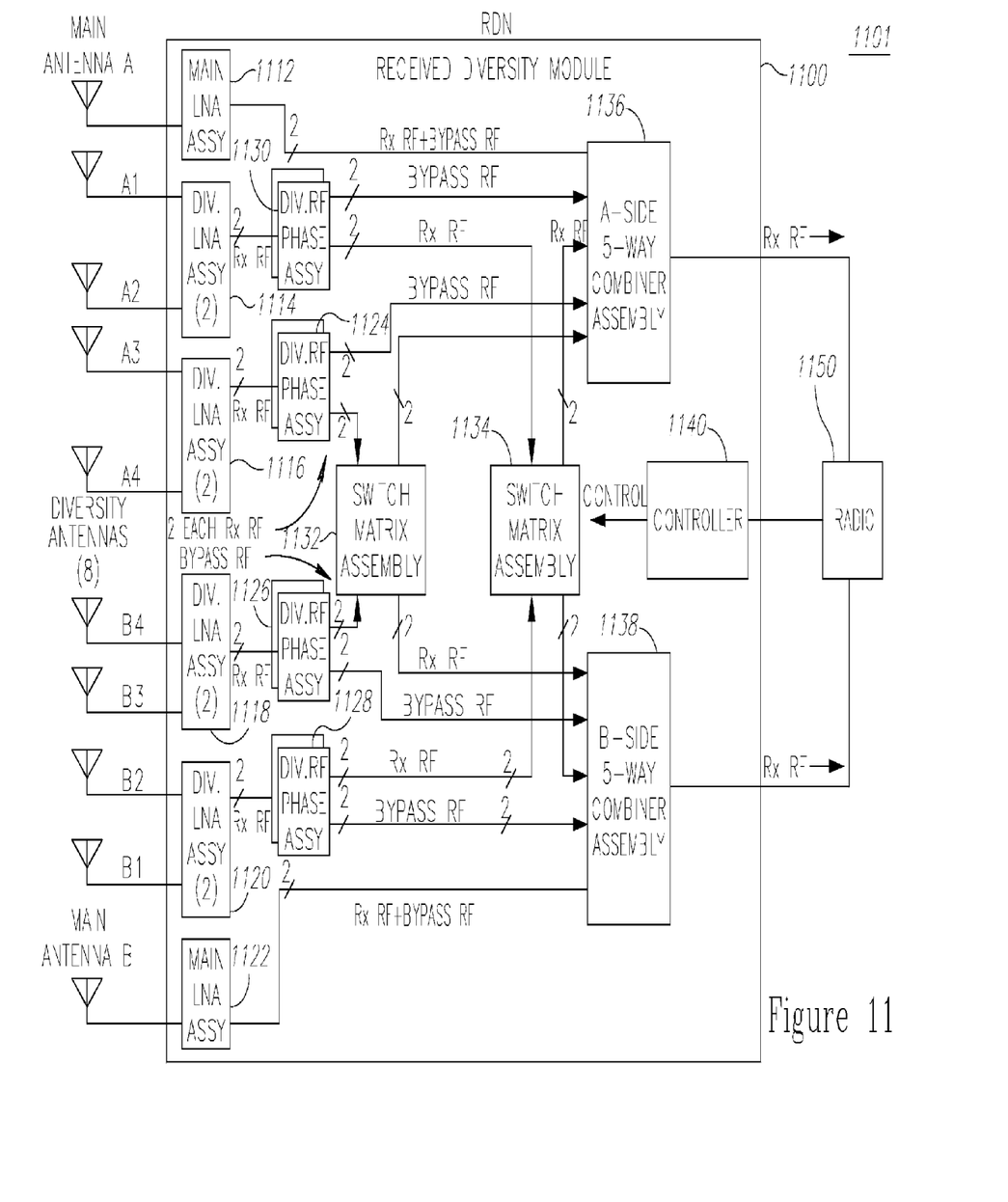
FIG. 11 is a schematic high level illustration of another MIMO receiving system having a ten antenna array with the RDN and antenna routing module pooling 2 sets of 4 antennas, according to some embodiments of the invention.

FIG. 11 is a schematic high illustration of another MIMO receiving system 1101 having a ten antenna array with the RDN and antenna routing module embodied as device 1100, according to some embodiments of the invention. One beamformer in the RDN is associated with a main antenna A and four diversity antennas A1 . . . A4 and comprises LNA assemblies 1112, 1114, 1116, phase modulators 1130, 1124 and combiner 1136, another beamformer is associated with a main antenna B and four diversity antennas B1 . . . B4 and comprises LNA assemblies 1118, 1120, 1122, phase modulators 1126, 1128 and combiner 1138. The diversity antennas A1 . . . A4 and B1 . . . B4 are modulated by the corresponding LNA assemblies and phase modulators. The antenna routing module is implemented by switch matrix assemblies 1132 and 1134. Combiners 1136 and 1138 are connected to radio unit 1150, which is also connected to controller 1140 that manages the setting of matrices 1132, 1134 according to qualitative indicators that are derived from the baseband module.

FIG. 10 is a schematic illustration of the second switch matrix, as implemented for the system of FIG. 11, according to some embodiments of the invention. One beamformer in the RDN is associated with antennas A, A1 . . . A4 and comprises combiner 1032, another beamformer is associated with antennas B, B1 . . . B4 and comprises combiner 1034. The antenna routing module is implemented in switches 1012, 1022, 1014, 1024 and switches 1016, 1026, 1018, 1028 to be used with antennas A1, A2, B1 and B2, offering a total of 36 unique antenna configurations rather than the 6 configurations provided by only one matrix, described in FIG. 8 above.

The following is a procedure that applies optimal pooling based on desired signal's power maximization with definitions set forth below.

NBF: number of beamformers sharing the same pool.
N: number of Rx antennas in each beamformer (it could vary).
NPool: number of Rx antennas in the pool (NPool ≤ NBF *(N−1)).
NTx: number of Tx antennas.
NFreq: number of frequencies.
$h_{i,j,k}$: channel transfer function from Tx antenna j, j=1, 2 . . . NTx, to Rx antenna i, i=1, 2 . . . NPool, at frequency k.
$\phi_i$: phase shift applied to Rx antenna.

The Rx antennas are numbered from 1 to NPOOL The indexes of all antennas assigned to a beamformer form a set. These sets are denoted by $SET_r$, r=1, 2 . . . NBF. For example, for two beamformers of five antennas each, the sets could be $SET_1=\{1, 3, 4, 7, 10\}$ and $SET_r=\{2, 5, 6, 8, 9\}$.

For each beamformer, phases $\phi_i$ are optimized for example using the algorithm described in a previous disclosure.

After optimizing the delta phase of all Rx antennas in use, the combined channel transfer functions seen by the receivers are:

$$S_{r,j,k} = \sum_{i \in SET_r} h_{i,j,k} e^{j\phi i},$$

r=1, 2 . . . NBF, j=1, 2 . . . NTx, k=1, 2 . . . NFreq The power $PWR_{r,j,k}$ associated with $S_{r,j,k}$ is defined as: $PWR_{r,j,k}=[abs(S_{r,j,k})]^2$, r=1, 2 . . . NBF, j=1, 2 . . . NTx, k=1, 2 . . . NFreq For each beamformer, a beamformer power $BF_{PWR_r}$ is defined as:

$$BF_{PWR_r} = \sum_{j=1}^{NTx} \square \sum_{k=1}^{NFreq} \square PWR_{r,j,k},$$

r=1, 2 . . . NBF The combined power of all beamformers, $PWR_{TOTAL}$, is defined as:

$$PWR_{TOTAL} = \sum_{r=1}^{NBF} BF_{PWR_r}$$

In the aforementioned embodiment, the optimal pooling is the one that maximizes $PWR_{TOTAL}$.

Following in table (1) below is a non limiting example illustrating the benefit of pooling based on the aforementioned power maximization procedure.

TABLE (1)

| Pooling TX Corr = 0.3 Rayleigh | Pooling Tx Corr = 0.3 Const. AMP | Pooling TX Corr = 0 Rayleigh | Pooling TX Corr = 0 Const. AMP | No pooling TX Corr = 0.3 Rayleigh | No pooling Tx Corr = 0.3 Const. AMP | No pooling TX Corr = 0 Rayleigh | No pooling Tx Corr = 0 Const. AMP | Rx Ant. | Tx Ant. |
|---|---|---|---|---|---|---|---|---|---|
| 2.21 dB | 2.39 dB | 2.09 dB | 2.26 dB | 2.01 dB | 2.19 dB | 1.85 dB | 1.97 Db | 2 | 2 |
| 3.69 dB | 3.96 dB | 3.50 dB | 3.79 dB | 3.31 dB | 3.57 dB | 3.02 dB | 3.20 dB | 3 | 2 |

TABLE (1)-continued

| Pooling TX Corr = 0.3 Rayleigh | Pooling Tx Corr = 0.3 Const. AMP | Pooling TX Corr = 0 Rayleigh | Pooling TX Corr = 0 Const. AMP | No pooling TX Corr = 0.3 Rayleigh | No pooling Tx Corr = 0.3 Const. AMP | No pooling TX Corr = 0 Rayleigh | No pooling Tx Corr = 0 Const. AMP | Rx Ant. | Tx Ant. |
|---|---|---|---|---|---|---|---|---|---|
| 4.80 dB | 5.10 dB | 4.56 dB | 4.93 dB | 4.30 dB | 4.59 dB | 3.92 dB | 4.12 dB | 4 | 2 |
| 5.67 dB | 6.00 dB | 5.41 dB | 5.82 dB | 5.11 dB | 5.41 dB | 4.65 dB | 4.85 dB | 5 | 2 |
| 1.98 dB | 2.05 dB | 1.64 dB | 1.72 dB | 1.79 dB | 1.87 dB | 1.42 dB | 1.48 dB | 2 | 4 |
| 3.34 dB | 3.42 dB | 2.79 dB | 2.90 dB | 2.98 dB | 3.09 dB | 2.35 dB | 2.44 dB | 3 | 4 |
| 4.38 dB | 4.44 dB | 3.65 dB | 3.78 dB | 3.92 dB | 4.02 dB | 3.07 dB | 3.16 dB | 4 | 4 |
| 5.19 dB | 5.25 dB | 4.34 dB | 4.48 dB | 4.68 dB | 4.78 dB | 3.64 dB | 3.74 dB | 5 | 4 |

In table (1) above, various number of transmitted layers (Tx ANT), as well as various number of receiving antennas per RF beamformers (Rx Ant) are compared with and without pooling.

In addition, table (1) presents how the received power changes when several variants are introduced, such as fading models (constant amplitude and Rayleigh), as well as different Tx ANT correlations (0, 0.3 are shown).

Throughout table (1) the performance metric used is gain achieved by a MIMO augmented by an RDN, over legacy MIMO (i.e., not augmented architecture) with the same number of layers, is expressed in dB. As the table shows, an increase in dB is achieved for all pooling cases, both for correlated and uncorrelated antennas and for various number of receive and transmit antennas alike.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A system comprising:
    a multiple-input-multiple-output (MIMO) receiving system comprising a MIMO baseband module having N branches;
    a radio distribution network (RDN) connected to the MIMO receiving system, the RDN comprising at least two beamformers, wherein each of the beamformers is fed by two or more antennas, so that a total number of antennas in the system is M, wherein M and N are integers and M is greater than N, wherein each of the beamformers includes at least one combiner configured to combine signals coming from the antennas feeding the respective beamformer into a combined signal; and
    an antenna routing module configured to swap at least one pair of antennas, each of the antennas in the at least one pair being associated with a different beamformer,
    wherein said antenna routing module is configured to swap said at least one pair of antennas based on at least one qualitative indicator derived from the baseband module, and
    wherein the antenna routing module is configured to route a subset of the antennas with respect to corresponding beamformers by a switching matrix that is dynamically adjusted according to the at least one qualitative indicator, wherein the at least one qualitative indicator comprises a combined power of all beamformers.

2. The system of claim 1, wherein the at least one swapped pair of antennas is selected to increase a diversity gain of the MIMO receiving system.

3. The system of claim 1, wherein the at least one swapped pair of antennas is selected with respect to at least one of signal phases and signal amplitudes.

4. The system of claim 1, wherein the at least one swapped pair of antennas is selected according to a specified antenna signal weighting.

5. The system of claim 1, wherein the combined power of all beamformers, $PWR_{TOTAL}$, is defined as:

$$PWR_{TOTAL} = \sum_{r=1}^{NBF} BF_{PWR_r},$$

wherein NBF represents the number of beamformers and $BF_{PWR_r}$ represents the total received power by beamformer r, and the at least one swapped pair of antennas is selected to maximize $PWR_{TOTAL}$.

6. A method of improving reception by a multiple-input-multiple-output (MIMO) receiving system comprising a MIMO baseband module having N branches and a radio distribution network (RDN) connected to the MIMO receiving system, the method comprising:
    associating at least two beamformers with the RDN, each of the beamformers including at least one corresponding combiner;
    feeding each of the beamformers by two or more antennas, so that a total number of antennas in the system is M, wherein M and N are integers and M is greater than N,
    configuring each combiner to combine signals coming from the antennas feeding the corresponding beamformer into a combined signal;
    swapping at least one pair of antennas, each of the antennas in the at least one pair being associated with a different beamformer, based on at least one qualitative indicator derived from the baseband module; and
    routing a subset of the antennas with respect to corresponding beamformers by a switching matrix that is dynamically adjusted according to the at least one qualitative indicator, wherein the at least one qualitative indicator comprises a combined power of all beamformers.

7. The method of claim 6, wherein the at least one swapped pair of antennas is selected to increase a diversity gain of the MIMO receiving system.

8. The method of claim 6, further comprising selecting the at least one swapped pair of antennas with respect to at least one of signal phases and signal amplitudes.

9. The method of claim 6, further comprising selecting the at least one swapped pair of antennas according to a specified antenna signal weighting.

10. The method of claim 6, wherein the combined power of all beamformers, $PWR_{TOTAL}$, is defined as:

$$PWR_{TOTAL} = \sum_{r=1}^{NBF} BF_{PWR_r},$$

wherein NBF represents the number of beamformers and $BF_{PWR_r}$ represents the total received power by beamformer r, and the at least one swapped pair of antennas is selected to maximize $PWR_{TOTAL}$.

* * * * *